United States Patent [19]

Schermerhorn et al.

[11] Patent Number: 4,789,389

[45] Date of Patent: Dec. 6, 1988

[54] METHOD FOR PRODUCING ULTRA-HIGH PURITY, OPTICAL QUALITY, GLASS ARTICLES

[75] Inventors: Paul M. Schermerhorn, Painted Post; Michael P. Teter; Robert V. Vandewoestine, both of Corning, all of N.Y.

[73] Assignee: Corning Glass Works, Corning, N.Y.

[21] Appl. No.: 52,619

[22] Filed: May 20, 1987

[51] Int. Cl.⁴ .................. C03B 37/023; C03B 37/016; C03B 19/06

[52] U.S. Cl. ..................................... 65/3.12; 65/3.11; 65/17; 65/18.1; 65/18.3; 501/12

[58] Field of Search ............... 65/3.11, 3.12, 17, 18.1, 65/18.3, 18.4; 501/12

[56] References Cited

U.S. PATENT DOCUMENTS

| | | | |
|---|---|---|---|
| 2,942,991 | 6/1960 | Smith . | |
| 3,310,392 | 3/1967 | Rhodes | 65/54 |
| 3,535,890 | 10/1970 | Hansen | 65/18.1 |
| 3,562,371 | 2/1971 | Bush | 264/65 |
| 3,678,144 | 7/1972 | Shoup | 264/42 |
| 4,042,361 | 8/1977 | Bihuniak | 65/18.1 |
| 4,042,550 | 8/1977 | Tuller | 260/280 P |
| 4,112,032 | 9/1978 | Blaszyk | 264/42 |
| 4,200,445 | 4/1980 | Bihuniak | 65/18.1 |
| 4,287,105 | 9/1981 | Rosler | 260/18 EP |
| 4,358,306 | 11/1982 | Okamoto | 65/32 |
| 4,414,014 | 11/1983 | Bruning | 65/31 |
| 4,419,115 | 12/1983 | Johnson | 65/3.12 |
| 4,426,216 | 1/1984 | Satoh et al. | 65/18.1 |
| 4,574,063 | 3/1986 | Scherer | 65/18.1 X |
| 4,608,215 | 8/1986 | Gonczy et al. | 264/56 |
| 4,622,056 | 11/1986 | Matsuo | 65/18.1 |
| 4,681,615 | 7/1987 | Toki et al. | 65/17 X |

FOREIGN PATENT DOCUMENTS

| | | |
|---|---|---|
| 84438 | 7/1983 | European Pat. Off. . |
| 2041913 | 9/1980 | United Kingdom . |
| 2086369 | 5/1982 | United Kingdom . |
| 2170799 | 8/1986 | United Kingdom . |

OTHER PUBLICATIONS

A. Robinson, *Science*, 208:1246–1249, Jun. 13, 1980.
Scherer et al., *Journal of Non-Crystalline Solids*, 63:163–172 (1984).
W. Twaddell, *EDN*, Nov. 20, 1980, pp. 53–54.
Whiteway et al., *Ceramic Bulletin*, 40:432–435 (1961).

*Primary Examiner*—Robert L. Lindsay
*Attorney, Agent, or Firm*—Walter S. Zebrowski

[57] ABSTRACT

A method for producing ultra-high purity, optical quality, glass articles is disclosed which involves: (1) forming a gel from a silicon-containing organic compound, such as, TEOS; (2) drying the gel to produce granules having a mean particle size of less than about 1 millimeter; (3) fully sintering the granules to produce high purity, artificial sand; (4) casting the artificial sand by conventional techniques, such as, slip casting, to form a high density, porous, green body; (5) drying and partially sintering the green body; (6) fully sintering the green body under vacuum; and (7) hot isostatic pressing ("hipping") the green body. The glass articles produced by the process have higher purity, greater homogeneity, and less IR absorption than existing, commercially available, premium quality, fused silica, glass articles. In addition, in accordance with the invention, high purity glass articles of complex shapes can be directly cast, rather than being machined or pressed from sheets of glass, as in the prior art.

33 Claims, 1 Drawing Sheet

METHOD FOR PRODUCING ULTRA-HIGH PURITY, OPTICAL QUALITY, GLASS ARTICLES

BACKGROUND OF THE INVENTION

1. Field of the Invention

This invention relates to a method for producing ultra-high purity, optical quality glass articles. More particularly, as described in full detail below, the invention involves: (1) using a sol-gel process to form fused silica granules, (2) preparing a green body from the granules, (3) purifying and consolidating the green body, and (4) subjecting the consolidated green body to hot isostatic pressing ("hipping") to produce the desired finished product.

2. Description of the Prior Art

Numerous investigators have attempted to apply the sol-gel technique to the production of optical quality glass products.

For example, Matsuyama et al., UK patent application No. GB 2,041,913, describes a gel casting method for producing "mother rods" from which optical waveguide fibers can be prepared wherein a solution of a silicon alkoxide is formed, allowed to gel so as to produce a porous preform, dried, and then sintered at a temperature below its melting temperature to produce the mother rod. The application describes a three step sintering process in which an atmosphere of oxygen and helium is used up to a temperature of 700° C., an atmosphere of chlorine and helium is used between 700° C. and 1000° C., and an atmosphere of just helium is used above 1000° C. As acknowledged in this application, drying the gel without cracking is difficult and can take as long as 10 days.

U.S. Pat. No. 4,419,115 to David W. Johnson, Jr., et al., describes a similar process for producing glass articles wherein fumed silica is mixed with a polar liquid to form a first sol, the first sol is gelled to form a first gel, the first gel is dried, heated to a temperature in the vicinity of 750°–850° C., cooled, redispersed in a polar liquid to form a second sol, the second sol is gelled to form a second gel, the second gel is dried, and the dried second gel is sintered to form the glass article.

The Johnson et al. patent states that the heating of the first gel to 750°–850° C. does not result in densification of the gel material. Specifically, the patent states that until final sintering, the BET surface area of its silica material remains essentially the same as that of fumed silica. With regard to sintering, the patent states that a helium atmosphere, which optionally contains chlorine, or a vacuum can be used during this step. Significantly, the patent employs the helium plus chlorine approach, and not the vacuum approach, in each of its examples. In practice, the process of the Johnson et al. patent, like the process of the Matsuyama et al. application, has been found to be subject to gel cracking problems.

In addition to the foregoing, sol-gel casting processes have also been described in Hansen et al., U.S. Pat. No. 3,535,890, Shoup, U.S. Pat. No. 3,678,144, Blaszyk et al., U.S. Pat. No. 4,112,032, Bihuniak et al., U.S. Pat. Nos. 4,042,361, and 4,200,445, and Scherer, U.S. Pat. No. 4,574,063, European patent publication No. 84,438, and Scherer et al., "Glasses from Colloids", *Journal of Non-Crystalline Solids*, 63: 163–172 (1984).

In particular, the Hansen et al. patent relates to a process in which an aqueous solution of colloidal silica particles is formed, dried to produce a gel, and the gel is sintered in a three step process, the first step comprising heating the gel to around 600° C. in a vacuum, the second step comprising flushing the gel with chlorine gas to remove bound water, and the third step comprising sintering the gel under vacuum by raising its temperature to 1200° C. The patent acknowledges the gel's high sensitivity to cracking during the drying process and states that drying times on the order of many days or weeks are needed to overcome this problem.

The Shoup patent, as well as the Blaszyk et al. patent, relate to a process in which gels are formed from soluble silicates, such as, alkali silicates. The dried gels can be used, for example, as filters, solid supports for catalysts, and the like, or can be consolidated into a solid glass body at temperatures ranging from 600°–1700° C. The gels produced by the soluble silicate technique are generally stronger than those produced by other sol-gel procedures. This makes crack-free drying of the gel easier and also facilitates the production of large castings. Alkali silicate solutions, however, contain significant amounts of iron. Accordingly, a leaching step is required if high purity glass is to be produced. Leaching is also generally required if the final product is to be alkali-free. In one set of examples, the Shoup patent compares consolidating a gel in air with consolidating a gel under a reduced pressure of 20 mm. In some cases, the reduced pressure resulted in a consolidated product which did not include bubbles; in other cases, bubbles still remained.

The Bihuniak et al. patents describe processes for densifying fumed silica and other fumed metal oxides by forming a sol, drying the sol to form fragments, and densifying the fragments by calcining them at 1150°–1500° C. Thereafter, the densified material can be milled, e.g., to an 8 to 10 micron average particle size, suspended in a casting medium, slip cast to form a porous preform, and fired to produce the desired finished product.

Because it employs fumed silica, the Bihuniak et al. process is more difficult to perform than the process of the present invention. For example, it is relatively difficult to form gels from fumed silica, and as acknowledged in the Bihuniak et al. patents, once formed, gels made from fumed silica tend to break up into large chunks, rather than small particles, as is desired. Further, extensive pollution abatement equipment is required to produce fumed silica since such production involves the creation of hydrochloric acid.

In addition, densified silica particles made from fumed silica tend to have higher impurity levels than the densified silica particles produced by the process of the present invention. These higher impurity levels are due in part to the fact that impurities, including trace amounts of radioactive materials, are introduced into the silica during the fuming process.

The higher impurity levels also arise from the fact that densification of particles made from fumed silica gels requires higher temperatures than densification of particles formed from gels prepared in accordance with the present invention, i.e., densification of particles made from fumed silica gels require temperatures above, rather than below, 1150° C. Such higher temperatures generally mean that metal-containing furnaces must be used to perform the densification. The use of such furnaces, in turn, means that the silica particles will be exposed to and thus will pick up metal ions which are released from the walls of the hot furnace. In addition to the purity problem, the need to generate higher temperatures to achieve densification is in general undesirable.

The Scherer references describe forming a gel from fumed oxides in a non-aqueous medium, e.g., an organic medium, drying the gel, exposing the dried gel to vacuum for a few hours and heating the gel in oxygen to remove residual organic constituents, and then sintering the gel in a helium or helium plus chlorine atmosphere.

As with various of the sol-gel techniques described above, the gels produced by the Scherer technique are relatively fragile and thus must be carefully handled to avoid cracking. Also, as is typical of processes in which gels are sintered, gels prepared in accordance with the Scherer process undergo a linear shrinkage of approximately 40% upon sintering. Such a shrinkage level makes it relatively difficult to cast complex shapes and also leads to relatively high levels of gel fracture during sintering. In addition to the foregoing, because the Scherer process uses fumed silica, it suffers from the impurity and pollution control problems associated with the fuming process (see discussion above).

The use of hot isostatic pressing ("hipping"), as well as other pressing techniques, to compress gas bubbles in vitreous materials has been described in a number of references. See Rhodes, U.S. Pat. No. 3,310,392, Bush, U.S. Pat. No. 3,562,371, Okamoto et al., U.S. Pat. No. 4,358,306, and Bruning et al., U.S. Pat. No. 4,414,014 and UK patent application No. 2,086,369. The Bush patent, in particular, discloses forming a green body, sintering the body in a vacuum, and then subjecting the consolidated body to isostatic pressure at a temperature equal to or greater than the sintering temperature.

SUMMARY OF THE INVENTION

In view of the foregoing state of the art, it is an object of the present invention to provide an improved process for producing optical quality, high purity, glass articles. In particular, it is an object of the invention to provide a process for producing such articles which involves the sintering of a porous silica body but avoids the cracking, shrinkage and purity problems encountered in prior art processes of this type.

With regard to products, it is an object of the invention to provide ultra-pure fused silica granules ("artificial sand") which can be used in a variety of conventional ceramic forming processes, such as, powder pressing, extrusion, slip casting, and the like, to produce green bodies. It is an additional object of the invention to produce glass articles of complex shapes which have higher purities, more uniform transmittance characteristics, and smaller index of refraction variations, i.e., better homogeneity, than similar articles produced by prior art techniques. It is a further object of the invention to economically produce optical waveguide fibers which have transmission characteristics equivalent to optical waveguide fibers produced by more expensive techniques.

In accordance with the invention, the foregoing and other objects are achieved by using the following method steps to produce fused silica glass articles:

(a) preparing a solution which contains at least one silicon-containing organic compound having the formula $Si(OR)_4$ or $SiR(OR)_3$, where R is an alkyl group;

(b) polymerizing the silicon in the solution to form a $SiO_2$ gel;

(c) drying the gel at a rate which causes the gel to fragment into granules having a mean particle size less than about 1 millimeter;

(d) sintering the granules at a temperature less than about 1150° C., the density of the granules after sintering being approximately equal to their maximum theoretical density;

(e) forming a green body from the sintered granules;

(f) drying and partially sintering the green body in a chamber by:
  (i) introducing oxygen into the chamber to reduce the level of organic materials associated with the green body; and
  (ii) raising the temperature of the chamber to above about 1000° C., e.g., to 1150° C., while introducing chlorine into the chamber and/or purging the chamber with an inert atmosphere and/or subjecting the chamber to a vacuum to reduce the level of water associated with the green body;

(g) fully sintering the green body in a chamber by raising the temperature of the chamber to a temperature above about 1720° C. while purging the chamber with helium or preferably applying a vacuum to the chamber; and (h) hot isostatic pressing the fully sintered green body in a chamber by raising the temperature of the chamber to above about 1150° C. and introducing an inert gas into the chamber at a pressure above about 1,000 psig and preferably above about 15,000 psig.

As discussed in detail below, for certain applications, subgroupings of the foregoing eight process steps can be employed. For example, steps (a) through (d) can be used to produce high purity, fused silica granules, which in themselves are useful articles of commerce. Similarly, green bodies produced from materials other than the glass granules of the present invention can be consolidated into bubble and water free glass articles through the use of steps (f) through (h).

Particular process steps can also be omitted depending on the specific conditions used and the purity requirements of the final product. For example, chlorine treatment may not be required in step (f) if the finished product does not have to have a low water content. Other modifications of this type are discussed below in connection with the description of the preferred embodiments of the invention.

Unlike prior art techniques which have employed sol-gel technology, the foregoing method provides a practical procedure for commercially producing ultra high purity, optical quality glass articles. The success of this technique is due to a number of factors. In the first place, the technique of the present invention does not use sol-gel technology to form a green body. Rather, sol-gel technology is used to produce artificial sand, and then conventional techniques, e.g., slip casting, are used to form a high density green body whose shape and size are near to that of the final product. In this way, the two main problems associated with sol-gel technology, i.e., gel cracking during drying and gel shrinkage upon sintering, are avoided.

Indeed, the present invention, rather than trying to prevent gels from cracking during drying, affirmatively uses the cracking phenomenon to create its artificial sand. Thus, rather than drying gels slowly, as was done in the prior art, the gels of the invention are dried rapidly so that they fragment into small granules.

To achieve this fragmentation, the gels of the invention are made from silicon-containing organic compounds, e.g., from tetraethylorthosilicate, rather than from fumed silica. Gels made from such organic compounds have smaller pore sizes than gels made from fumed silica. Accordingly, during drying, greater stresses are generated in these gels, and thus smaller particles are produced when the gels crack during drying. Depending on the application, these small particles can either be used directly or, if desired, can be milled to smaller sizes using conventional techniques and equipment.

In addition to their fragmentation characteristics, the use of gels made from silicon-containing organic compounds, rather than fumed silica, is also advantageous for various other reasons. First, as discussed above, it is in general easier to make gels from silicon-containing organic compounds than from fumed silica. Further, because of the differences in the way they are manufactured, higher purities can be achieved for silicon-containing organic compounds than for fumed silica. Also, less pollution is generated during the manufacturing of the organic compounds than during the manufacturing of fumed silica.

In addition, it is easier to maintain high levels of purity when working with gels made from silicon-containing organic compounds than when working with gels made from fumed silica. Specifically, because gels made from organic compounds have higher densities, water contents, and surface areas than gels made from fumed silica, granules produced from organic compound gels can be sintered at lower temperatures than granules produced from fumed silica gels. Lower sintering temperatures mean that it is easier to keep the sintering environment free from contaminants. In particular, the lower sintering temperatures mean that high purity, silica-based reactors, as opposed to metallic or ceramic $ZrO_2$ furnaces, can be used to perform the sintering.

In addition to providing high purity, fused silica granules, the method of the invention also carries the high purity level of the granules through to the final product and, at the same time, produces a finished product having excellent optical properties. In particular, the oxygen and chlorine treatments during the drying of the green body specifically reduce the levels of water and organic matter in the finished product. In addition, the use of the preferred vacuum sintering means that any bubbles or similar defects which are created during sintering will in essence be empty voids. These empty spaces can be easily closed during hipping.

As described in detail in Example 2 below, it has been found that by means of the invention, finished products of complex shapes, such as, optical domes, antenna windows, sight glasses, aerospace viewports, lenses, prisms, mirrors, etc., can be readily produced which have equivalent or better optical properties than similar products produced by other techniques. In particular, the products have been found to have higher purities, smaller index of refraction variations (better homogeneities), and more uniform transmittance characteristics from the ultraviolet through the infrared than similar commercial products which have heretofore been available. In addition, as illustrated in Example 3, the method of the invention can be used to produce low loss, optical waveguide fibers. Significantly, in accordance with the invention, production costs for such fibers can be reduced.

The principles of the invention, as well as its preferred embodiments, are explained and illustrated by the accompanying figures and the examples present below. These figures and examples, of course, are for purposes of illustration only and are not intended to limit the scope of the invention.

DESCRIPTION OF THE PREFERRED EMBODIMENTS

Figure 1:
FIGS. 1 and 2 show the appearance of the silica granules of the present invention before and after sintering, respectively. The numbers on the scales shown in these figures represent centimeters.

As discussed above, the present invention involves producing glass articles by: (1) using a sol-gel process to form fused silica granules, (2) preparing a green body from the granules, (3) purifying and consolidating the green body, and (4) subjecting the consolidated green body to hot isostatic pressing to produce the desired finished product.

The sol-gel process employs at least one silicon-containing organic compound having the formula $Si(OR)_4$ or $SiR(OR)_3$, where R is an alkyl group. Tetraethylorthosilicate ("TEOS"), having the formula $Si(OC_2H_5)_4$, is the preferred silicon-containing organic compound, although other organosilicon compounds, including, for example, tetramethylorthosilicate having the formula $Si(OCH_3)_4$, and methyltrimethoxysilane, having the formula $SiCH_3(OCH_3)_3$, can be used. The silicon-containing organic compound can be partially hydrolyzed. For example, partially hydrolyzed TEOS sold by the Stauffer Chemical Company under the trademark SILBOND 40 is a suitable starting material for preparing the gels of the present invention. In general, the use of a single silicon-containing organic compound is preferred, although mixtures of such compounds can be used, if desired.

A solution of the silicon-containing organic compound is prepared and then gelled. Preferably, the solution is an aqueous solution which includes an acid, such as, hydrochloric acid, as a gelation catalyst. Other solvents, e.g., organic solvents such as ethanol, can be added to improve miscibility, and other gelation catalysts, e.g., acids such as formic and nitric acid, can be used.

In the case of TEOS, water to TEOS mole ratios in the range of 4:1 to 15:1 have been found to work successfully. Theoretically, ratios as low as 2:1 can be employed. Higher ratios produce gels having larger surface areas and pore sizes which are easier to dry. In some cases, for higher ratio gels, drying alone has been found to sufficiently reduce the level of organic material within the gel, so that oxygen treatment of the gel can be omitted. The higher ratio gels, however, mean that less product is produced for the same size reaction vessel. In general, a mole ratio of 6:1 has been found to produce a reasonable amount of product which can be readily dried.

If the final product is to be doped, in addition to the primary silicon-containing organic compound, the solution will also contain other organic or inorganic compounds which include the dopant elements. Examples of elements which can be introduced into the solution in the form of soluble compounds include aluminum, antimony, barium, beryllium, bismuth, boron, bromine, cadmium, calcium, cerium, chlorine, chromium, cobalt, copper, europium, fluorine, germanium, iron, lanthanum, lead, lithium, magnesium, neodymium, nickel, oxygen, phosphorous, potassium, samarium, silver, sodium, strontium, tantalum, tin, titanium, uranium, vanadium, yttrium, zinc, and zirconium. One or more dopants can be used, as desired.

A particularly preferred dopant is titanium since it allows for the production of ultra-low expansion glasses, i.e., glasses having an expansion coefficient of less than $0.5 \times 10^{-7}$ cm/cm/°C. This dopant can be conveniently introduced into the solution as a titanium ester having the formula $Ti(OR)_4$, where R is an alkyl group. Examples of titanium esters which are suitable for use with the present invention include tetraethyl titanate having the formula $Ti(OC_2H_5)_4$ and tetraisopropyl titanate having the formula $Ti(OCH(CH_3)_2)_4$.

The solution of the organosilicon compound and dopants, if used, is preferably gelled in a quartz reactor or similar vessel. Gelation results in (1) polymerization of the silicon, and (2) the production of an alcohol, such as, ethanol in the case of TEOS. Typical gelation times for a solution pH in the range of 1-2 are in the range of 1-4 hours at a temperature of from 60° C. to 75° C. Gelation times can be reduced by applying heat to the organosilicon solution. Also, if desired, high speed gelation can be achieved by neutralizing the pH of the TEOS solution through the addition of a basic solution, such as, a 1.2% ammonium carbonate solution. Gelation times in the range of seconds can be achieved in this way.

Once gelation has been completed, the gel is dried to (1) remove residual water and alcohol (carbon), and (2) fragment the gel into granules having a mean particle size less than about 1 millimeter. The drying can be conveniently performed in the same reactor used to prepare the gel, or the gel can be removed and dried in specialized drying equipment, e.g., in a rotary dryer or rotary vacuum dryer.

When the drying is performed in the reactor used to prepare the gel, drying temperatures above about 250° C. are preferred. At such temperatures, drying times on the order of 30 hours are typical. To remove the water and alcohol, the gel is either purged with an inert atmosphere, e.g., an argon atmosphere, or subjected to a vacuum. Purging and vacuum treatments can be used sequentially, if desired.

When the drying is performed using a rotary dryer or a rotary vacuum dryer, temperatures above the boiling point of water, e.g., on the order of 120° C., have been found to be adequate. In the case of vacuum rotary dryers, it has been found that vacuum should not be applied to the gel at the beginning of the drying process since it causes the gel to collapse which impedes the removal of water and organics. Vacuum, however, can be used at the end of the drying process where it does help in the removal of water and organics. Typical drying times when either a rotary or rotary vacuum dryer is used are on the order of 8 hours. It has been observed that smaller granules are produced by rotary drying than by bulk drying in the reactor in which the gel was produced.

In addition to the foregoing methods, drying can be accomplished by forming the gel in thin sheets and allowing the sheets to dry at room temperature. The thin sheet approach, however, is not preferred for commercial production.

Depending on the characteristics of the gel and the particular drying conditions employed, drying alone may reduce the level of organics associated with the granules to a point where charred carbon particles do not form upon sintering of the granules. Alternatively, the organics can be removed by purging the gel granules with an oxygen-containing atmosphere at an elevated temperature. To avoid the production of charred carbon particles during this process, the rate of oxygen purging must be controlled so that the exothermic reaction between oxygen and organics does not cause the temperature of the drying chamber to rise above about 340° C.

In the case of gels formed from TEOS, depending on the $H_2O$:TEOS ratio, the amount of acid catalyst used, and the specific drying protocol employed, the dried gel granules will typically have a density of approximately 1.29-1.59 grams/cc, a pore size of approximately 20-100 angstroms, and a surface area to mass ratio of between about 150 and about 700 meter$^2$/gram.

For comparison, if fumed silica is used as the starting material, the resulting dried gel will have a lower density of approximately 0.31-0.88 grams/cc and a larger pore size of approximately 700-1000 angstroms. Moreover, the drying of such a fumed silica gel will generally not produce granules having a mean particle size less than one millimeter, but rather, will produce larger particles and chunks which are not well-suited for further processing.

Once the gel has been dried and thus fragmented, the gel granules are fully sintered, i.e., they are sintered to a density which is approximately equal to their maximum theoretical density. The sintering process causes various changes in the character of the gel granules. Specifically, during sintering, the polymeric structure of the gel granules relaxes, water is given off (condensation reaction) which, in turn, affects the granules' apparent viscosity, and the pores of the granules collapse. Overall, the sintering process results in a dramatic decrease in surface area to mass ratio of the granules, i.e., from the 150-700 meter$^2$/gram range to a value less than 0.5 meter$^2$/gram.

The sintering of the gel granules is conducted at a temperature of less than about 1150° C. This low sintering temperature allows the sintering to be conducted in the same quartz reactor used for gelation and drying. The use of such reactor, as opposed to a metal furnace, helps maintain the purity of the granules through the sintering procedure. Alternatively, if the gel has been removed from the original quartz reactor for drying, it can be returned to a silica-based reactor for sintering.

For comparison, to sinter a gel formed from fumed silica required temperatures well above 1150° C., e.g., in the range of 1250°-1450° C. This difference in sintering temperatures is due primarily to the fact that the pore size for gels made from fumed silica is generally on the order of 700 angstroms, while the pore size for gels made from silicon-containing organic compounds is generally less than about 100 angstroms. As known in the art, sintering temperature generally decreases with decreasing pore size. See Scherer et al., supra.

The sintering can be performed in a variety of atmospheres. For example, helium, helium/oxygen, and argon/oxygen atmospheres can be used. In some cases, a helium atmosphere has been found preferable to an argon/oxygen atmosphere. The sintering can also be performed in air.

A sintering period of approximately one hour at temperatures in the 900°-1000° C. range is generally sufficient to achieve full densification of the granules. The specific temperature needed will depend on pore size of the gel. The pore size, in turn, will depend on the $H_2O$:TEOS ratio used to produce the gel. As illustrated in Table I, higher mole ratios result in gels having larger surface areas but lower densities. Accordingly, the pore sizes for these gels are greater and thus higher sintering temperatures are required to achieve full densification.

Sintering temperature is also affected by the amount of chemically bound water associated with the granules. For example, it has been found that if the water level in a gel has been reduced by means of a chlorine gas treatment, high sintering temperatures, e.g., temperatures 100°–150° C. higher, are required to obtain full densification of the granules.

The fully-sintered granules constitute ultra-pure, artificial sand. As discussed in copending application Ser. No. 052,655, which is entitled "Encapsulating Compositions Containing Ultra-Pure, Fused-Silica Fillers" and which is being filed simultaneously herewith, the fully-sintered granules can be used as a filler for potting sensitive electronic components, such as, semiconductor memory devices. In comparison with prior art silica fillers, the granules contain lower amounts of such radioactive materials as uranium and thorium, and thus produce less alpha particles which can interfere with the operation of state-of-the-art electronic components. The pertinent portions of the above-referenced copending application are incorporated herein by reference.

In accordance with the present invention, the fully-sintered granules are used to form high density green bodies. In particular, the granules are used as the starting material for such conventional processes as slip casting, injection molding, extrusion molding, cold isopressing, and the like. A description of these and other processes in which the artificial sand of the present invention can be used can be found in such texts as *Introduction to Ceramics*, by W. D. Kingery, John Wiley and Sons, Inc., New York, 1960, and *Ceramic Processing Before Firing*, G. Y. Onoda, Jr., and L. L. Hench, editors, John Wiley and Sons, Inc., New York, 1978, the pertinent portions of which are incorporated herein by reference. With regard to slip casting in particular, descriptions of this technique can be found in U.S. Pat. No. 2,942,991 and in Whiteway, et al., "Slip Casting Magnesia," *Ceramic Bulletin*, 40: 432–435 (1961), the pertinent portions of which are also incorporated herein by reference.

For many of these processes, such as, slip casting, it is preferred to reduce the size of the granules prior to casting. This can be readily accomplished by a variety of milling techniques, including vibra-milling, ball milling, jet impingement or fluid energy milling, triter milling, and the like. Combinations of these milling techniques can also be used. If desired, the milling can be performed prior to sintering of the granules. In general, it has been found that unsintered granules are easier to fracture than sintered granules.

For slip casting, it has been found preferable to form the green body from a slurry which has a specific gravity greater than about 1.70 grams/cc and which is composed of granules having a mean particle size in the 10–15 micron range. Such a slurry can be conveniently produced using a urethane-lined vibra-mill to which the granules, silica media, and water are added. Using a slurry of this type, high density green bodies, e.g., green bodies having a porosity on the order of 20%, are readily prepared.

For various of the other casting methods, e.g, injection, extrusion, and pressing techniques, it is generally preferred to employ a binder in the slurry. Such a binder can be conveniently formed by in situ hydrolyzation of TEOS. By way of illustration, a slurry of the granules of the present invention was successfully cast in a plastic mold, as opposed to a plaster of Paris mold, by adding 5 milliliters of an acid-catalyzed TEOS/water mixture (4 moles water to each mole of TEOS) to 132 milliliters of slurry. After molding, 2–7 milliliters of a basic solution (1.2% ammonium carbonate) was added to the slurry. The basic solution shifted the pH causing the TEOS to gel within a period of from about 2 to about 30 minutes, thus binding the granules together to form a strong green body, well-suited for further processing. Alternatively, commercial binders, such as those sold by the Stauffer Chemical Company under the SILBOND trademark, can be used.

Once formed, the green body is purified and consolidated by a two-step process. In the first step, the green body is dried and partially sintered. In the second step, the green body is fully sintered.

The drying and partial sintering step, among other things, serves to remove water from the green body which could form bubbles in the final product during full sintering. To minimize contamination, this step is preferably performed in a quartz tube furnace, although other types of furnaces can be used, if desired. When a quartz tube furnace is used, the temperatures employed are preferably kept below about 1150° C.

Drying and partial sintering are achieved by raising the temperature of the furnace to above about 1000° C., while introducing chlorine into the furnace and/or applying a vacuum to the furnace and/or purging the furnace with one or more inert gases, e.g., with argon and/or helium. The chlorine treatment, vacuum stripping and/or inert gas purging reduces the chances that the water content of the green body will cause bubbles to form during full sintering. In addition to removing water, the chlorine treatment has also been found to reduce the green body's iron, copper, and calcium levels. When the green body is formed by slip casting, the chlorine treatment's ability to strip calcium is of particular value since the green body tends to pick up calcium from the plaster of Paris mold.

Optionally, the drying and partial sintering step can include subjecting the green body to an oxygen-containing atmosphere to reduce its content of organic materials.

The oxygen treatment can be omitted if the green body includes only minor levels of organic material contamination. The chlorine treatment can be omitted in cases where the final product can have a relatively high water content, e.g., in cases where the absorption characteristics of the final product in the infrared region are not critical. When the chlorine treatment is omitted, either vacuum stripping or inert gas purging should be performed. If desired, both vacuum stripping and gas purging can be used sequentially. Either or both the vacuum stripping and the inert purging can be omitted when the chlorine treatment is used.

After the green body has been dried and partially sintered, it is fully sintered at a temperature above about 1720° C. Full sintering is preferably performed in a vacuum of, for example, $1 \times 10^{-5}$ torr. Alternatively, helium purging can be used, although this is less preferred since any bubbles which form in the glass during sintering will be filled with helium, rather than being empty, as occurs during vacuum sintering.

The full sintering of the cast granules can be performed in, for example, a tungsten-molybdenum furnace or a helium-filled graphite furnace. To minimize contamination, the green body is preferably supported on quartz cloth and monoclinic unstabilized zirconia A grain. Specifically, it has been found preferable to use monoclinic unstabilized zirconia, as opposed to stabilized zirconia, as the support for the green body during the sintering process. Grain of this type is available from Corning Glass Works, Corning, N.Y., under product designation Zircoa GGA.

In general, full sintering, as well as cooling of the sintered product, can be completed in about 3 hours. Thereafter, if desired, the surfaces of the consolidated green body can be cleaned with hydrofluoric acid. Also, areas of the green body which may have become deformed during sintering, e.g., areas in contact with the quartz cloth, can be removed by grinding.

For certain applications, e.g., the production of consolidated preforms for optical waveguide fibers, the fully sintered green body may be ready for use without further processing. In most cases, however, it is preferred to hip the sintered green body to collapse any bubbles which may have formed in the body during the sintering process.

The hipping is performed in the pressure chamber of a hipping furnace (see, for example, U.S. Pat. No. 4,349,333) by heating the chamber to a temperature greater that the annealing point of the consolidated green body and less than about 1800° C., while introducing an inert gas, such as, argon, helium, or nitrogen, into the chamber at a pressure in the range of 100-45,000 psi. In practice, temperatures in the range of 1150°-1740° C. and pressures in the range of 1,000-30,000 psig have been found suitable for collapsing bubbles and other voids in consolidated green bodies produced in accordance with the present invention. Lower pressures, e.g., pressures in the 100-1000 psig range, can also be used.

To avoid contamination of the consolidated green body during hipping, it is preferred to wrap the body in glass wool and steel foil before it is placed in the hipping furnace. These precautions, however, can be omitted in the case of a "clean" furnace which has only been used to hip high purity silica materials.

After hipping has been completed, various conventional glass treatment procedures, such as, annealing, grinding, polishing, drawing, pressing, etc., can be applied to the fully sintered and hipped green body. The resulting finished product is then ready for use by the consumer.

Based on the foregoing description, the invention will now be further illustrated by the following specific examples.

EXAMPLE 1

This example illustrates the preparation of ultra-pure artificial sand in accordance with the method of the present invention.

21.14 kilograms of TEOS (Eastman Kodak Chemical Company, Rochester, N.Y.), was filtered through a 0.6 micron filter (Pall Company, Corland, N.Y.) into a 50 liter polyethylene container. 9.072 kilograms of deionized (DI) water, which had been filtered through a Millipore filter (pore size=0.2 microns), was combined with 0.0209 kilograms of hydrochloric acid (Fisher Scientific Company, Rochester, N.Y.). This mixture was also filtered through the Pall filter and then added to the TEOS. The resulting mixture was stirred until a temperature of 65°-75° C. was reached, and then transferred to a quartz reactor and allowed to gel. If desired, the mixture can be filtered through a 2.5 micron filter before being transferred to the quartz reactor.

Drying and sintering of the gel was performed as follows. First, the reactor was placed in a furnace and the temperature of the furnace was raised to 100° C. at a rate of 100° C./hour. During this initial heating, the reactor was purged with argon at a rate of 200 cc/minute. The argon, as well as all other gases used in the process, was filtered through a 0.6 micron Pall filter before being introduced into the reactor.

The furnace was held at 100° C. for a half an hour, and then raised to 300° C. at a rate of 50° C./hour. The argon purging rate was increased to 800 cc/minute during this second heating phase. When the temperature of the gel reached 290° C., the furnace was cooled to 250° C. At this point, the gel had completely fragmented into fine granules having a mean size of less than about 1 millimeter and a surface area to mass ratio of approximately 200 meter$^2$/gram.

Using a computer-controlled feedback loop, oxygen was then introduced into the reactor at a rate such that the temperature of the reactor did not exceed 340° C. as a result of the exothermic reaction between the oxygen and the residual organics associated with the gel. Alternatively, oxygen was introduced into the reactor in accordance with a 10 cc/minute/hour ramp up to a maximum of 200 cc/minute. This rate of oxygen introduction was also found to control the oxygen-organic reaction so as to avoid the formation of charred carbon particles.

The oxygen treatment was continued until the temperature of the gel dropped below 300° C., at which point the temperature of the furnace was ramped to 400° C. at a rate of 25° C./hour. The temperature of the furnace was held at 400° C. for 4 hours. FIG. 1 shows the typical appearance of the granules at this stage of the process.

Figure 2:
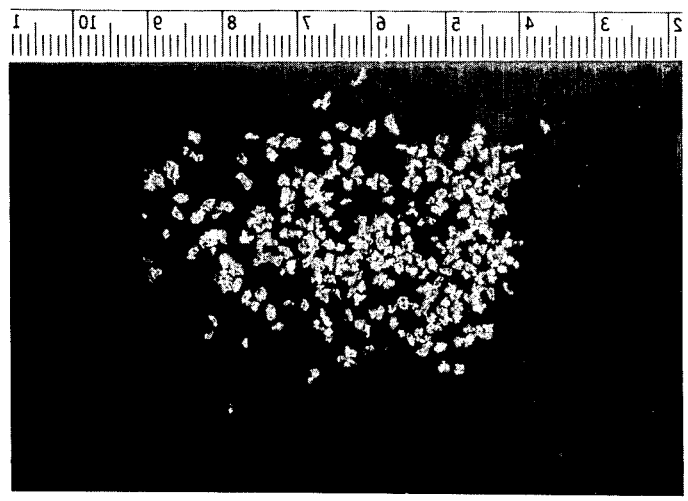

After the four hour holding period at 400° C., the temperature of the furnace was raised to 925° C. at a rate of 75° C./hour to fully sinter the granules. After the sintering, the granules had (1) a smaller mean size than before sintering, e.g., a mean size on the order of 0.6 millimeters, and (2) a reduced surface area to mass ratio on the order of 0.08 meter$^2$/gram. FIG. 2 shows the typical appearance of the fully sintered granules.

The overall process from initial preparation of the TEOS solution to final sintering of the granules took less than 100 hours.

Flame emission, graphite furnace, and D.C. plasma analyses were performed on the fully sintered granules to determine their K, Li, and Na concentrations (flame emission), their Al, Cr, Cu, Fe, Mn, and Ni concentrations (graphite furnace), and their Ba, Ca, Ti, and Zr concentrations (D.C. plasma). The carbon content of the particles was determined using LECO carbon analysis, and their uranium and thorium concentrations were determined by neutron activation analysis. For comparison, similar analyses were performed on Deguassa's commercial AEROSIL OX 50 fumed silica (Deguassa Chemical Company, Teterboro, N.J.).

The results of these analyses are shown in Table II. As shown therein, the artificial sand of the present invention was found to have either equivalent purity or to be more pure than fumed silica with respect to each of the foregoing elements. Moreover, as illustrated in the following example, unlike fumed silica, the artificial sand of the present invention is ideally suited for preparing high purity glass articles by conventional casting techniques.

In addition to the foregoing analyses, neutron activation analyses for forty-one elements were performed on granules which had been vibra-milled so that they would pass through a 325 mesh screen but not through a 600 mesh screen. The results of these analyses are shown in Table III. As shown therein, the granules of the present invention maintained their purity through the milling process.

EXAMPLE 2

This example illustrates the preparation of an ultra-pure, optical quality glass article from the artificial sand of Example 1 by means of slip casting.

5,005 grams of the fully sintered granules of Example 1 and 1,407 grams of DI water were milled in a polyurethane-lined vibra mill with silica media for 17 hours. The resulting slurry had a specific gravity of 1.741 grams/cc. The particles making up the slurry had a mean size of 12.5 microns. The slurry was passed through a 297 micron screen and collected in a polyethylene container. The container was continuously rotated on a roller mill until slip casting was performed.

A flat plaster of Paris plate was prepared, and a 3" PVC hollow cylinder was placed onto the top surface of the plate. The inside surface of the hollow cylinder was sprayed with a mold release compound and filled with 50 ml of DI water. After the water had been absorbed into the plaster, the cylinder was filled with 125 ml of the artificial sand slurry, care being taken not to create bubbles while pouring the slurry into the cylinder.

The cylinder was covered and allowed to stand for 10-15 hours. The green body was then removed, covered with a cloth, and allowed to stand at room temperature for 24 hours prior to drying and partial sintering. The density of the green body was approximately 78% of the final density of the finished product.

Drying and partial sintering of the green body was performed in a quartz tube furnace as follows. First, the temperature of the furnace was raised to 110° C. at a rate of 2° C./minute while purging the furnace with a mixture of argon and oxygen (400 cc/minute argon; 100 cc/minute oxygen). As in Example 1, the argon and oxygen, as well as the other gases used in processing the green body, were filtered through 0.6 micron Pall filters.

The furnace was held at 110° C. for 2 hours and then raised to 1000° C. at a rate of 3° C./minute. After two hours at 1000° C., the argon/oxygen mixture was changed to a helium/chlorine mixture (3.5% chlorine; 200 cc/minute flow rate). The temperature of the furnace was then ramped to 1150° C. at a rate of 75° C./hour and held at that temperature for 6 hours. The helium/chlorine flow rate was then reduced to 25 cc/minute, and the furnace was allowed to cool. When the furnace temperature had dropped into the 200°-300° C. range, the helium/chlorine purge was stopped and replaced with an argon purge.

The dried and partially sintered green body was fully sintered in a tungsten-molybdenum vacuum furnace (vacuum=$1 \times 10^{-5}$ torr) as follows. The body was placed on zirconia beads and quartz cloth in a molybdenum tray. The tray was placed in the furnace, and the temperature of the furnace was ramped to 1000° C. at a rate of 25° C./minute. The furnace temperature was held at 1000° C. for 10 minutes, and then ramped to 1450° C. at a rate of 25° C./minute. The furnace was held at 1450° C. for 30 minutes, and then ramped to 1740° C. at a rate of 25° C./minute. After 5-10 minutes at 1740° C., the furnace was allowed to cool to 600° C., at which point the furnace's chamber was backfilled with helium. The furnace was then cooled to room temperature, and the fully sintered green body was removed. Although the foregoing processing procedure works successfully, even better results are achieved when slower ramps are used between the various holding temperatures, e.g., ramps on the order of 6.5° C./minute.

After sintering, the surfaces of the consolidated body were found to be covered with a thin translucent white haze. This haze was found to result from the use of zirconia beads as the support for the green body. Use of A-grain zirconia has been found to eliminate the haze. Also, some areas of the body were found to have devitrified. Both the haze and the devitrified areas were easily removed with hydrofluoric acid. In addition to the hydrofluoric acid treatment, the portions of the body which had been in contact with the quartz cloth were ground away.

The fully sintered green body was then hipped using a conventional hipping furnace as follows. The body was wrapped in Alpha Quartz wool and steel foil and placed in the furnace's pressure chamber. The pressure in the chamber was raised to 7,000 psi with argon (not filtered), and then the furnace's temperature was raised to 1320° C. at a rate of 20° C./minute. The pressure in the chamber was raised to 20,000 psi and the furnace was held at this pressure and temperature for a period of 45 minutes. Thereafter, the furnace was cooled to 800° C. at a rate of 10° C./minute, and then cooled to room temperature.

To produce the finished product, the hipped, fully-sintered green body was annealed, ground, and polished. The annealing was performed as follows. The body was placed onto a fused silica flat plate and quartz cloth for support and placed in a tube reactor. The temperature in the reactor was raised to approximately 1150° C. at a rate of 240° C./hour and held at this temperature for 1 hour. The reactor was then cooled to room temperature at a rate of 20° C./hour. Throughout the annealing process, the reactor was purged with an argon/oxygen mixture (200 cc/minute argon; 50 cc/minute oxygen).

The yield of the various process steps from TEOS polymerization through to the production of the high density, porous green body were as follows: TEOS to fully sintered granules—99%; fully sintered granules to milled granules—97.5%; milled granules to green body—90.3%. Overall, from TEOS to annealed product, the yield was approximately 86.3%.

Finished glass products produced in accordance with the foregoing procedures have been found to have the following characteristics: (1) a particle count in the glass on the order of 500 counts/cc (this value can be reduced by performing the process using conventional clean room techniques); (2) an IR transmission coefficient at 2.73 microns of 90-91% for 10 mm of glass; (3) a UV transmission coefficient at 200 nm of approximately 82% for 10 mm of glass; (4) a UV transmission coefficient at 185 nm of approximately 70% for 10 mm of glass; (5) a homogeneity in all directions of approximately $2.75 \times 10^{-6}$ for fully annealed samples; (6) a strain point of 993° C.; (7) an annealing point of 1113° C.; (8) an average expansion coefficient between 0° C. and 200° C.

of $0.54 \times 10^{-6}$; (9) an average expansion coefficient between $-100°$ C. and $200°$ C. of $0.39 \times 10^{-6}$; (10) a $\log_{10}$ resistivity of 12.87 ohm-cm at $200°$ C.; (11) a dielectric constant at 1 kHz of 3.91 at $25°$ C.; (12) a loss tangent at 1 kHz of 0.003 at $25°$ C.; and (13) an Abbe' constant of $V_D = 73.2$, $n_F = 1.465$, $n_D = 1.461$, $n_C = 1.459$.

For comparison, a commercially available premium quality fused silica glass sold by Corning Glass Works under the designation 7940 has the following characteristics: (1) a particle count in the glass on the order of 130 counts/cc for grade AO quality glass; (2) an IR transmission coefficient at 2.73 microns of approximately 0% for 10 mm of glass; (3) a UV transmission coefficient at 200 nm of approximately 88% for 10 mm of glass; (4) a UV transmission coefficient at 185 nm of approximately 80% for 10 mm of glass; (5) a homogeneity in one direction of approximately $1.5 \times 10^{-6}$; (6) a strain point of $990°$ C.; (7) an annealing point of $1075°$ C.; (8) an average expansion coefficient between $0°$ C. and $200°$ C. of $0.57 \times 10^{-6}$; (9) an average expansion coefficient between $-100°$ C. and $200°$ C. of $0.48 \times 10^{-6}$; (10) a $\log_{10}$ resistivity of 13.0 ohm-cm at $200°$ C.; (11) a dielectric constant at 1 kHz of 4.00 at $25°$ C.; (12) a loss tangent at 1 kHz of 0.00002 at $25°$ C., and (13) an Abbe' constant of $V_D = 67.8$, $n_F = 1.463$, $n_D = 1.458$, $n_C = 1.456$.

Purity data for the glass of the present invention and the 7940 glass are set forth in Table IV.

As these representative data illustrate, the glass produced by the present invention is functionally equivalent to the commercially available premium glass, and indeed is superior to that glass with regard to homogeneity and IR transmission dispersion. With regard to purity, the glass of the invention is generally more pure than the 7940 glass. Moreover, the process of the present invention can be used to directly cast complex shapes, while the commercially available premium glass is produced in bulk form so that if complex shapes are to be made, they must be machined out of or pressed from sheets of the bulk material.

In sum, as demonstrated by this example, the process of the invention allows conventional casting procedures to be used to produce high purity, optical quality glass products which are equivalent to or, with regard to certain properties, superior to existing, commercially available, premium glass products.

EXAMPLE 3

This example illustrates the use of the process of the present invention to prepare the outer portion of the cladding for an optical waveguide fiber.

A conventional chemical vapor deposition process was used to form a glass rod consisting of a central germania-doped region (core) surrounded by a pure silica region (inner portion of the cladding). (If desired, the core can have a uniform index of refraction or can include regions having different indices of refraction.) The glass rod was heated and stretched to form a segment of "cane" having a diameter in the 6-8 mm range.

A plaster of Paris mold was formed having an internal cylindrical cavity whose length was approximately 4 inches and whose diameter was approximately 2.4 inches. The walls of the cavity sloped outward from the bottom to the top of the cavity at an angle of approximately 1°. The bottom of the cavity included an aperture for receiving one end of the cane, and the top of the cavity was closed with a plastic cover which included a corresponding aperture for receiving the other end of the cane.

The cane was supported in the mold by means of the top and bottom apertures, the mold was pre-wetted with DI water, and filled with a slurry of milled, artificial sand prepared from TEOS following generally the procedures described above in Examples 1 and 2. The slurry had a specific gravity of 1.75.

After 15 hours, a strong green body had formed which was easily removed from the mold. The green body was held at room temperature for 48 hours, dried and partially sintered in (1) an oxygen-containing atmosphere and (2) a chlorine-containing atmosphere, and then fully sintered under vacuum. The procedures used were generally those described in Example 2.

In some, but not all, cases, the fully sintered green body was hipped, again following generally the procedures of Example 2. Prior to being drawn into fiber, the outside surface of the green body was cylindrically ground to a diameter of approximately 45 mm, cleaned with hydrofluoric acid and fire polished. Drawing was performed using a standard draw furnace.

The transmission and strength characteristics of fibers prepared in accordance with the above procedure are set forth in Table V, where samples 1 and 3 were prepared using hipping and sample 2 was prepared without hipping. As shown in this table, the fibers had excellent transmission and strength characteristics. These results are considered surprising in view of the fact that they represent initial experiments, as opposed to a fully refined and optimized process.

TABLE I

| Sintering Temperature (°C.) | Water:TEOS Mole Ratio | | |
| --- | --- | --- | --- |
| | 5 to 1 | 10 to 1 | 15 to 1 |
| | Surface Area (M²/gram) | | |
| 400 | 192 | 596 | 673 |
| 500 | 150 | 560 | 663 |
| 600 | 122 | 475 | 548 |
| 700 | 118 | 398 | 443 |
| 800 | 13 | 206 | 354 |
| 900 | <0.5 | 4 | 88 |
| 950 | — | — | <0.5 |
| Density before sintering (gm/cm³) | 1.529 | — | 1.290 |

TABLE II

| | PURITY (ppb) | |
| --- | --- | --- |
| Element | Deguassa OX-50 | Granules of the Present Invention |
| Carbon (%) | * | 0.034 |
| Lithium | 27 | <54 |
| Sodium | <233 | <233 |
| Potassium | <966 | <966 |
| Barium | <110 | <110 |
| Calcium | 200 | 150 |
| Titanium | 6140 | 220 |
| Zirconium | 240 | 230 |
| Aluminum | 66500** | <23 |
| Chromium | 51 | 1 |
| Copper | 5 | 3 |
| Iron | 927 | 46 |
| Manganese | 10 | <4 |
| Nickel | 55 | <18 |

*not measured
**Aluminum analysis performed by the D.C. plasma technique.

TABLE III

Neutron Activation Analysis of Milled Silica Granules (parts per million)

| Titanium | <35.0 |

TABLE III-continued
Neutron Activation Analysis of Milled Silica Granules (parts per million)

| | | |
|---|---|---|
| Tin | <0.5 | |
| Iodine | <0.003 | |
| Manganese | 0.322 | ± 5.0% |
| Copper | <0.6 | |
| Vanadium | <0.02 | |
| Chlorine | <0.3 | |
| Aluminum | 20.937 | ± 1.0% |
| Mercury | <0.0015 | |
| Samarium | <0.0001 | |
| Tungsten | <0.7 | |
| Molybdenum | <0.009 | |
| Uranium | <0.0001 | |
| Lanthanum | <0.0004 | |
| Cadmium | <0.017 | |
| Arsenic | <0.001 | |
| Antimony | <0.0001 | |
| Zirconium | <0.4 | |
| Bromine | 0.0038 | ± 15.0% |
| Sodium | 0.259 | ± 10.0% |
| Potassium | <100.0 | |
| Cerium | <0.0015 | |
| Calcium | <5.0 | |
| Lutetium | <0.001 | |
| Europium | <0.005 | |
| Selenium | <0.010 | |
| Terbium | <0.0006 | |
| Thorium | <0.0005 | |
| Chromium | 0.002 | ± 20.0% |
| Ytterbium | <0.004 | |
| Hafnium | <0.001 | |
| Barium | <0.1 | |
| Neodymium | 0.013 | ± 20.0% |
| Cesium | <0.0005 | |
| Silver | <0.002 | |
| Nickel | <0.45 | |
| Scandium | 0.00003 | ± 15.0% |
| Rubidium | <0.005 | |
| Iron | 0.258 | ± 20.0% |
| Zinc | <0.025 | |
| Cobalt | 0.0017 | ± 12.0% |

TABLE IV

| Element | PURITY (ppb) 7940 | Present Invention |
|---|---|---|
| Sodium | <233 | <233 |
| Potassium | <966 | <966 |
| Copper | 1521 | 2–7 |
| Magnesium | 10–100 | * |
| Calcium | 180 | 350–380 |
| Zinc | 50–500 | * |
| Boron | 50–500 | * |
| Aluminum | <32 | <25 |
| Chlorine | 10000–100000 | * |
| Titanium | 420 | 120–180 |
| Phosphorous | 10–100 | * |
| Arsenic | 1–5 | * |
| Antimony | 1–5 | * |
| Bismuth | 10–100 | * |
| Vanadium | 10–100 | * |
| Chromium | 4 | 1–<24 |
| Manganese | <4 | <3 |
| Iron | 117 | 42–48 |
| Lithium | <54 | <54 |
| Nickel | <20 | 2–<15 |
| Zirconium | 170 | 180–230 |
| Barium | <100 | <110 |
| Uranium | * | .1–.3 |
| Thorium | * | <.5 |

*not measured

TABLE V

| Sample | Attenuation Rate (dB/Km) @ 1300 nm | Fiber Strength Weibull 50% Failure Probability |
|---|---|---|
| 1 | 0.39–0.50 | 60 KPSI |
| 2 | 0.36–0.50 | 426.9 KPSI |
| 3 | 0.39 | 426.6 KPSI |

What is claimed is:

1. A method for producing a fused silica glass article comprising the steps of:
   (a) preparing a solution which contains at least one silicon-containing organic compound having the formula $Si(OR)_4$ or $SiR(OR)_3$, where R is an alkyl group;
   (b) polymerizing the silicon in the solution to form a $SiO_2$ gel;
   (c) drying the gel at a rate which causes the gel to fragment into granules having a mean particle size less than about one millimeter;
   (d) sintering the granules at a temperature less than about 1150° C., the density of the granules after sintering being approximately equal to their maximum theoretical density;
   (e) forming a green body from the sintered granules;
   (f) drying and partially sintering the green body in a chamber by (i) raising the temperature of the chamber to above about 1000° C., and (ii) introducing chlorine gas into the chamber and/or subjecting the chamber to a vacuum and/or purging the chamber with an inert gas; and
   (g) fully sintering the green body in a chamber by raising the temperature of the chamber to a temperature above about 1720° C. while purging the chamber with helium or applying a vacuum to the chamber.

2. The method of claim 1 including the additional step after step (g) of hot isostatic pressing the fully sintered green body in a chamber by raising the temperature of the chamber to above about 1150° C. and introducing an inert gas into the chamber at a pressure above about 100 psig.

3. The method of claim 2 wherein the fully sintered green body is wrapped in glass wool prior to the hot isostatic pressing step.

4. The method of claim 1 wherein the solution of step (a) contains tetraethylorthosilicate having the formula $Si(OC_2H_5)_4$.

5. The method of claim 1 wherein the glass article is doped through the inclusion in the solution of step (a) of at least one element selected from the group consisting of aluminum, antimony, barium, beryllium, bismuth, boron, bromine, cadmium, calcium, cerium, chlorine, chromium, cobalt, copper, europium, fluorine, germanium, iron, lanthanum, lead, lithium, magnesium, neodymium, nickel, oxygen, phosphorous, potassium, samarium, silver, sodium, strontium, tantalum, tin, titanium, uranium, vanadium, yttrium, zinc, and zirconium.

6. The method of claim 5 wherein the element is titanium and the glass article has a coefficient of expansion of less than $0.5 \times 10^{-7}$ cm/cm/°C.

7. The method f claim 6 wherein the titanium is introduced into the solution as a titanium ester having the formula $Ti(OR)_4$, where R is an alkyl group.

8. The method of claim 7 wherein the titanium ester is selected from the group consisting of tetraethyl titanate having the formula $Ti(OC_2H_5)_4$ and tetraisopropyl titanate having the formula $Ti(OCH(CH_3)_2)_4$.

9. The method of claim 1 wherein the drying of step (c) is performed in a rotary dryer at a temperature above about 100° C.

10. The method of claim 1 wherein the gel and/or the granules are treated with oxygen during at least a portion of step (c) to remove organic materials.

11. The method of claim 10 wherein the rate of oxygen treatment is controlled so as to prevent substantial charring of the gel and/or the granules.

12. The method of claim 11 wherein the rate of oxygen treatment is controlled so that the temperature of the gel and/or the granules does not rise above about 340° C.

13. The method of claim 1 wherein the surface area per unit mass of the granules prior to sintering step (d) is greater than about 150 square meters per gram and the surface area per unit mass of the granules after sintering is less than about 0.5 square meters per gram.

14. The method of claim 1 wherein the sintered granules of step (d) are milled in water to form a slurry and wherein the green body is formed by slip casting the slurry.

15. The method of claim 14 wherein the mean particle size of the milled granules is between about 5 microns and about 15 microns.

16. The method of claim 14 wherein the specific gravity of the slurry is greater than about 1.70 grams per cubic centimeter.

17. The method of claim 1 wherein the granules are held together in the green body by means of an organosilicon binder.

18. The method of claim 1 wherein oxygen is introduced into the chamber during at least a portion of step (f) to reduce the level of organic material associated with the green body.

19. The method of claim 1 wherein the glass article is an optical waveguide fiber and wherein:
(i) the solution of step (a) contains tetraethylorthosilicate having the formula $Si(OC_2H_5)_4$;
(ii) the sintered granules of step (d) are milled in water to form a slurry, said milled granules having a mean particle size between about 5 microns and about 15 microns;
(iii) the green body is formed by slip casting the slurry about a rod which contains a center portion and an outer portion, the center portion including at least one region which has an index of refraction which is greater than the outer portion;
(iv) chlorine is introduced into the chamber during step (f); and
(v) the fully sintered green body produced by step (g) is drawn into an optical waveguide fiber.

20. The method of claim 19 wherein during at least a portion of drying step (c), the gel and/or the granules are treated with oxygen to remove organic materials.

21. The method of claim 19 including the additional step after step (g) of hot isostatic pressing the fully sintered green body in a chamber by raising the temperature of the chamber to above about 1150° C. and introducing an inert gas into the chamber at a pressure above about 100 psig.

22. A method for producing fused silica granules comprising the steps of:
(a) preparing a solution which contains at least one silicon-containing organic compound having the formula $Si(OR)_4$ or $SiR(OR)_3$, where R is an alkyl group;
(b) polymerizing the silicon in the solution to form a $SiO_2$ gel;
(c) drying the gel at a rate which causes the gel to fragment into granules having a mean particle size less than about 1 millimeter; and
(d) sintering the granules at a temperature less than about 1150° C., the density of the granules after sintering being approximately equal to their maximum theoretical density.

23. The method of claim 22 including the additional step after step (d) of milling the granules to reduce their mean particle size.

24. The method of claim 23 wherein the granules are milled until their mean particle size is between about 5 microns and about 15 microns.

25. The method of claim 22 wherein the solution of step (a) contains tetraethylorthosilicate having the formula $Si(OC_2H_5)_4$.

26. The method of claim 22 wherein the glass granules are doped through the inclusion in the solution of step (a) of at least one element selected from the group consisting of aluminum, antimony, barium, beryllium, bismuth, boron, bromine, cadmium, calcium, cerium, chlorine, chromium, cobalt, copper, europium, fluorine, germanium, iron, lanthanum, lead, lithium, magnesium, neodymium, nickel, oxygen, phosphorous, potassium, samarium, silver, sodium, strontium, tantalum, tin, titanium, uranium, vanadium, yttrium, zinc, and zirconium.

27. The method of claim 26 wherein (i) the element is titanium, and (ii) the titanium is introduced into the solution as a titanium ester having the formula $Ti(OR)_4$, where R is an alkyl group.

28. The method of claim 27 wherein the titanium ester is selected from the group consisting of tetraethyl titanate having the formula $Ti(OC_2H_5)_4$ and tetraisopropyl titanate having the formula $Ti(OCH(CH_3)_2)_4$.

29. The method of claim 22 wherein the drying of step (c) is performed in a rotary dryer at a temperature above about 100° C.

30. The method of claim 22 wherein the gel and/or the granules are treated with oxygen during at least a portion of step (c) to remove organic materials.

31. The method of claim 30 wherein the rate of oxygen treatment is controlled so as to prevent substantial charring of the gel and/or the granules.

32. The method of claim 31 wherein the rate of oxygen treatment is controlled so that the temperature of the gel and/or the granules does not rise above about 340° C.

33. The method of claim 22 wherein the surface area per unit mass of the granules prior to sintering step (d) is greater than about 150 square meters per gram and the surface area per unit mass of the granules after sintering is less than about 0.5 square meters per gram.

* * * * *